US009690952B2

(12) United States Patent
Johnson (10) Patent No.: US 9,690,952 B2
(45) Date of Patent: *Jun. 27, 2017

(54) ENCRYPTION KEY GENERATION IN ENCRYPTED STORAGE DEVICES

(71) Applicant: ClevX, LLC, Kirkland, WA (US)

(72) Inventor: Simon B. Johnson, Bonney Lake, WA (US)

(73) Assignee: ClevX, LLC, Kirkland, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/749,627

(22) Filed: Jun. 24, 2015

(65) Prior Publication Data

US 2015/0371061 A1    Dec. 24, 2015

Related U.S. Application Data

(63) Continuation of application No. 13/720,020, filed on Dec. 19, 2012, now Pat. No. 9,076,018.

(51) Int. Cl.
| | | |
|---|---|---|
| G06F 21/72 | (2013.01) | |
| H04L 9/08 | (2006.01) | |
| G06F 21/00 | (2013.01) | |
| G06F 21/80 | (2013.01) | |
| H04L 29/06 | (2006.01) | |

(52) U.S. Cl.
CPC .............. *G06F 21/72* (2013.01); *G06F 21/00* (2013.01); *G06F 21/80* (2013.01); *H04L 9/08* (2013.01); *G06F 2221/2107* (2013.01); *H04L 63/0428* (2013.01)

(58) Field of Classification Search
CPC . G06F 21/80; G06F 21/72; H04L 9/08; H04L 63/0428
USPC .......................................................... 713/189
See application file for complete search history.

(56) References Cited

U.S. PATENT DOCUMENTS

| | | | |
|---|---|---|---|
| 4,694,412 A | | 9/1987 | Domenik et al. |
| 5,760,700 A | * | 6/1998 | Ellis ..................... B60R 25/1003 340/5.26 |
| 5,778,069 A | * | 7/1998 | Thomlinson ............ G06F 7/582 380/262 |
| 5,787,179 A | * | 7/1998 | Ogawa .................. H04N 7/1675 348/E7.056 |
| 5,850,450 A | * | 12/1998 | Schweitzer ............. G06F 7/588 345/503 |
| 6,044,388 A | | 3/2000 | DeBellis et al. |
| 6,578,145 B1 | * | 6/2003 | Greene ................ G06Q 20/341 713/150 |
| 6,728,740 B2 | | 4/2004 | Kelly et al. |

(Continued)

*Primary Examiner* — Hadi Armouche
*Assistant Examiner* — Shahriar Zarrineh
(74) *Attorney, Agent, or Firm* — Schwegman Lundberg & Woessner, P.A.

(57) ABSTRACT

A system and method of generating an encryption key in a self-encrypting mass storage device that includes using a manual input device as input for a micro-controller that contains a cyclic counter. An input device event triggers the micro-controller to read the current state of the cyclic counter. An accumulation of cyclic counter values is used as a source of entropy to seed a deterministic random number generator. The output of the deterministic random number generator is used as an encryption key for encryption/decryption processes within the mass storage device.

18 Claims, 4 Drawing Sheets

(56) References Cited

U.S. PATENT DOCUMENTS

| | | | |
|---|---|---|---|
| 7,177,426 B1* | 2/2007 | Dube | G06F 21/6209 380/262 |
| 7,406,174 B2* | 7/2008 | Palmer | H04L 9/0662 380/28 |
| 7,421,462 B2 | 9/2008 | Castejon-Amenedo et al. | |
| 7,594,114 B2* | 9/2009 | Hooker | H04L 9/3271 713/170 |
| 7,716,491 B2* | 5/2010 | Brookner | G06Q 20/3558 713/183 |
| 8,001,054 B1 | 8/2011 | Peart et al. | |
| 8,370,143 B1* | 2/2013 | Coker | G06F 17/276 704/240 |
| 8,751,819 B1* | 6/2014 | Langsworth | H04L 9/0637 380/28 |
| 9,076,018 B2 | 7/2015 | Johnson | |
| 2001/0015957 A1* | 8/2001 | Kawarai | H04L 12/5601 370/230 |
| 2002/0111918 A1* | 8/2002 | Hoshino | G06Q 20/06 705/65 |
| 2003/0061168 A1* | 3/2003 | Routhenstein | G06Q 20/04 705/64 |
| 2003/0069910 A1 | 4/2003 | Kelly et al. | |
| 2003/0105964 A1* | 6/2003 | Brainard | G06Q 20/32 713/178 |
| 2004/0161989 A1* | 8/2004 | Dennis | B32B 5/18 442/135 |
| 2005/0044425 A1* | 2/2005 | Hypponen | G06F 21/36 726/19 |
| 2005/0172137 A1 | 8/2005 | Hopkins | |
| 2006/0251249 A1 | 11/2006 | Orr et al. | |
| 2007/0130470 A1* | 6/2007 | Blom | G06F 21/64 713/181 |
| 2008/0046216 A1* | 2/2008 | Thomas | H04L 9/002 702/179 |
| 2008/0184367 A1* | 7/2008 | McMillan | G06F 21/563 726/23 |
| 2008/0263363 A1 | 10/2008 | Jueneman et al. | |
| 2009/0319782 A1 | 12/2009 | Lee | |
| 2010/0174922 A1 | 7/2010 | Johnson et al. | |
| 2010/0239087 A1* | 9/2010 | Chaisson | G06F 21/46 380/44 |
| 2011/0075840 A1 | 3/2011 | Zayas et al. | |
| 2011/0252243 A1* | 10/2011 | Brouwer | H04L 9/0838 713/189 |
| 2011/0296179 A1* | 12/2011 | Templin | H04L 9/0869 713/168 |
| 2012/0102334 A1* | 4/2012 | O'Loughlin | G06F 21/57 713/189 |
| 2012/0179735 A1 | 7/2012 | Ferguson et al. | |
| 2013/0136255 A1* | 5/2013 | Brown | H04L 9/0869 380/28 |
| 2013/0268775 A1* | 10/2013 | Hawkins | G06F 21/64 713/189 |
| 2014/0208109 A1* | 7/2014 | Narendra Trivedi | H04L 9/0643 713/170 |

* cited by examiner

ENCRYPTION KEY GENERATION IN ENCRYPTED STORAGE DEVICES

CROSS REFERENCE TO RELATED APPLICATIONS

This is a continuation of co-pending U.S. patent application Ser. No. 13/720,020 filed Dec. 19, 2012.

STATEMENT REGARDING FEDERALLY SPONSORED RESEARCH OR DEVELOPMENT

Not applicable.

FIELD OF THE INVENTION

The present invention relates to encrypted storage devices, and more particularly to the creation of encryption key entropy used within encrypted storage devices.

BACKGROUND OF THE INVENTION

Encrypted storage devices are used to store sensitive and confidential information. Drives of the self-encrypting variety contain their own encryption engine in which data gets encrypted when being written, and decrypted when read. Paramount to this whole process is the encryption key. How did this key get created? Who created it and in what country? What is its entropy?

A strong encryption key has the maximum amount of entropy allowed by its size. For example, a 256 bit AES key should have 256 bits of entropy. An encryption key based on a user password has relatively little entropy. A password of 8 characters, assuming upper and lower case letters and numbers, can generate up to 218,340,105,584,896 different numbers, which seems like a lot, but not when compared to $1.16 \times 10^{77}$ possible values available from a 256 bit key.

Given the ever increasing processing power of computers, it is desirable to have maximum entropy in order to thwart brute force attacks. Therefore, an encryption key based on a user password is not the most desired means.

Generating a truly random number is difficult. Some mass storage manufacturers program encryption keys at the factory. These keys are generated by factory computers and copied into a region of private memory within the mass storage device. Customers are typically concerned with how these keys are created and whether the factory can associate a serial number with an encryption key. In addition, can the factory be trusted to create encryption keys with sufficient entropy? And, do mass storage devices contain duplicate keys?

Given the difficulty of having a mass storage device create its own entropy, once factory programmed encryption keys are zeroized, the drive will no longer work and becomes a paper weight.

There is accordingly an unmet need in the art to provide a mass storage device with the built-in ability to create a virtually unlimited supply of encryption keys with the entropy equivalent to its key length.

An example of a prior art device is shown in US Publication No. 2011/0075840, entitled Method and System for Generating Random Numbers in a Storage Device, filed Sep. 30, 2009, to Fernando Zayas et al.

Another example of a prior art device is shown in US Publication No. 2008/0263363, entitled Portable Data Encryption Device with Configurable Security Functionality and Method for File Encryption, filed Jan. 22, 2008 to Robert R. Jueneman.

A further example of such a prior art device is shown in U.S. Pat. No. 6,044,388, entitled Pseudo-random number generator, issued Mar. 28, 2000 to Robert S. Debellis et al.

Another prior art device is shown in U.S. Pat. No. 5,778,069, entitled Non-biased pseudo random number generator, issued Jul. 7, 1998 to Thomlinson et al.

A prior art device is shown in U.S. Pat. No. 8,001,054, issued Aug. 16, 2011 entitled System and method for generating an unpredictable number using a seeded algorithm, to Lee J. Peart et al.

A further prior art device is shown in U.S. Pat. No. 4,694,412, issued Sep. 15, 1987, entitled Random number generator for use in an authenticated read-only memory, to Domenik et al.

A prior art device is shown in U.S. Pat. No. 7,421,462, issued Sep. 2, 2008, entitled Method and apparatus for generating a random bit stream, to Castejon-Amenedo et al.

Another prior art device is shown in U.S. Pat. No. 6,728,740, entitled Random number generator seeding method and apparatus, to Kelly et al. This patent shows a plurality of event sensors associated with separate counters, and which is used to create a seed number which is then stored in a seed register. The counters identified in this patent are for a time stamp count, instructions executed, date of reads and writes, and a microsecond timer.

A publication in US 2012/0179735 having a filing date of Jan. 16, 2011 shows a device entitled Scalable random number generation, having inventors Ferguson et al.

SUMMARY OF THE INVENTION

The present invention relates to disk drives having encryption, and more specifically to removable disk drives which have password protection.

The apparatus and system according to the present invention provides a mass storage device with an integrated input device mechanism that is electrically connected to a micro-controller equipped with a cyclic counter. In use, an input event causes the micro-controller to read the cyclic counter's current value; a predetermined number of such input events results in providing a mechanism of creating enough entropy to seed a deterministic random number generator (DRNG). The output of the DRNG is then used as an encryption key for encrypting/decrypting data contained within mass storage media.

Certain embodiments of the invention have other aspects in addition to or in place of those mentioned above. These aspects will become apparent to those skilled in the art from a reading of the following detailed description when taken with reference to the accompanying drawings.

Other objects and advantages of the present invention will be more readily apparent from the following detailed description when read in conjunction with the accompanying drawings.

DETAILED DESCRIPTION OF THE INVENTION

Figure 1:
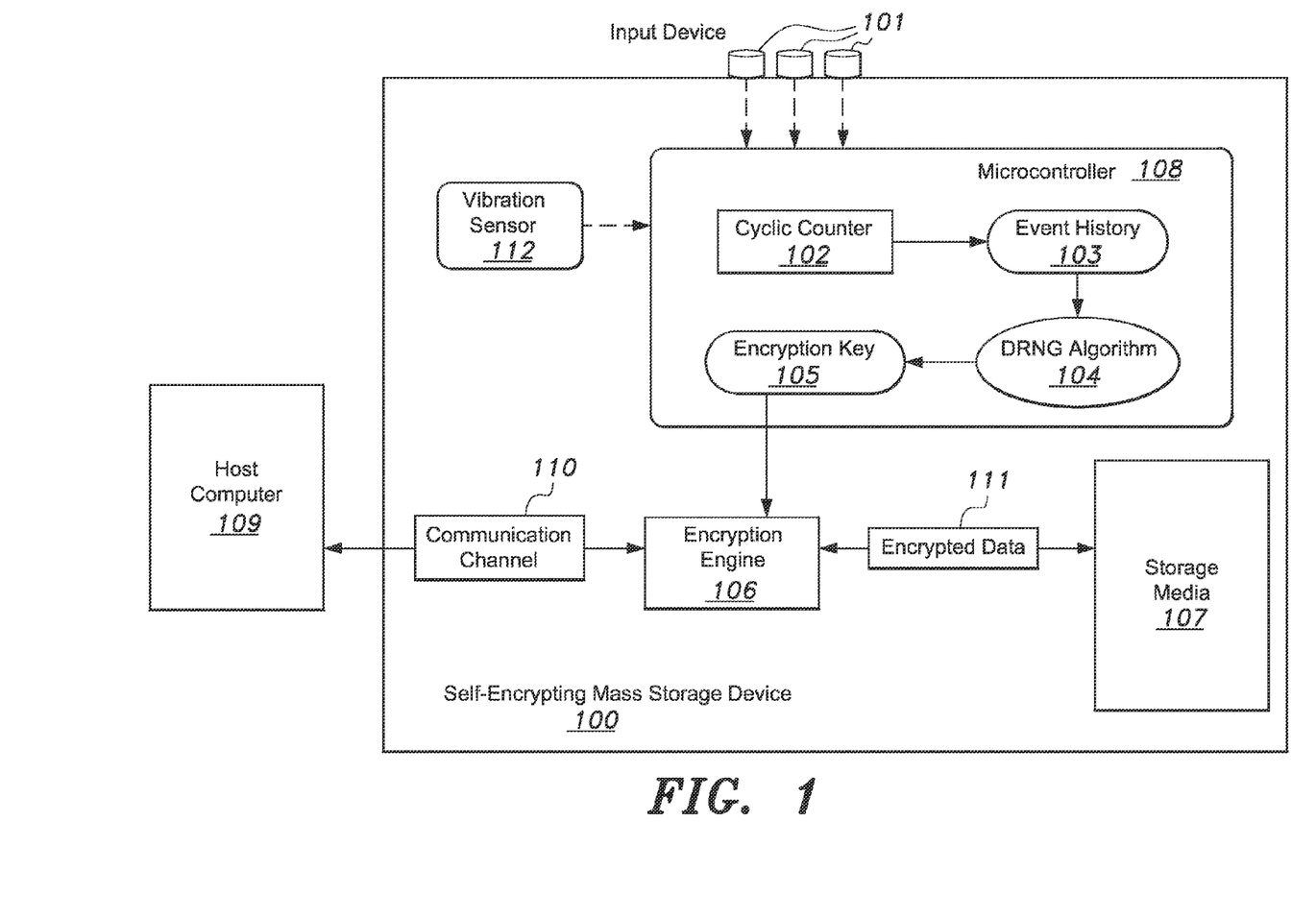
FIG. 1 schematically depicts a self-encrypting mass storage device with an integrated human interface device ("HID").

FIG. 1 schematically depicts a self-encrypting mass storage device 100 with an integrated human interface device 101 (hereafter "HID 101"). A host computer 109 is shown which is in communication with the device 100. The HID 101 in this view is represented by a plurality of manually operable keys. The device 100 includes a communication channel 110 for communicating with the host computer 109, an encryption engine 106, and a storage media 107 for storing encrypted data 111. The encrypted data 111 can be written to the storage media 107 and can be later read from the storage media 107. The device 100 also includes a microcontroller 108, described further below.

As will be seen from the following discussion and the accompanying drawings, the device, system, and method of the present invention has the following significant advantageous features: (a) it is applied to a storage device having its own input mechanism; (b) it does NOT calculate the time between events, but rather uses key presses as a random interrupt; and (c) it ties creation of entropy to PIN definition.

The encryption engine 106 communicates with an external host computer via a communication channel 110, and also communicates with the storage media 107. The encryption engine 106 is connected to the microcontroller 108 such that the encryption engine 106 can access the encryption key 105. The encryption engine 106 uses the encryption key 105 to encrypt received data through the communication channel 110 for storage on the storage media 107. The encryption engine 106 also receives and decrypts the encrypted data 111 which is read from the storage media 107, using the encryption key 105.

The microcontroller 108 includes a cyclic counter 102, a memory for storing an event history 103, an encryption key 105, and a DRNG algorithm 104. As noted above, the abbreviation DRNG stands for "deterministic random number generator." The cyclic counter 102 in a preferred embodiment is a 16 bit cyclic counter running at 1 MHz.

FIG. 1 additionally shows a vibration sensor 112 having an output connected to the microcontroller 108. The sensor 112 is an optional feature, which can be omitted from the main embodiment, and which is instead used in another embodiment of the present invention.

The apparatus and system of FIG. 1 is discussed in greater detail, as follows.

The self-encrypting mass storage device 100 is of typical architecture in which the encryption engine 106 is coupled via the communication channel 110 with the host computer 109. The communication channel 110 can, for example, be of a type known as USB or Firewire, and it is contemplated that the channel 110 can also include a mechanism in which data can be exchanged with a host.

The encryption key 105 is used by the encryption engine 106 to operate on data passed over the communication channel 110 to create the encrypted data 111 which is then stored on the storage media 107. Likewise, the encrypted data 111 is retrieved from the storage media 107 and is decrypted prior to being sent via the communication channel 110 to the host computer 109.

A significant feature of the present invention relates to the apparatus and method by which the encryption key 105 is generated. In a preferred embodiment of the present invention, the self-encrypting drive 100 contains an integrated human interface device 101 such as buttons for entering a PIN (personal identification number). The entered PIN is for user authentication and must be defined by the user before the self-encrypting mass storage device 100 can be used.

The micro-controller 108 is provided with an internal cyclic counter 102 as described above, running at a high frequency. The input device 101 generates events during the process of defining a user PIN, as explained in the following. For example, each time a button of the input device 101 is pressed, an event is triggered causing the micro-controller 108 to read the value of the cyclic counter 102. The cyclic counter 102, at any given instant, has a higher degree of entropy than the input value itself. For example, in one example the mass storage device 100 comes equipped with 10 numeric digits for defining a PIN. A 4 digit PIN can, therefore, have 10,000 unique values. On the other hand, a 16 bit cyclic counter read on each event will generate any of 4,294,967,296 unique values. In fact, the exact same PIN will generate a completely different set of random values based on the cyclic counter 102 because it's impossible for humans to replicate the timing of their actions down to the micro-second range.

Upon detection of an event, namely actuation of the keys in the input device 101 in the above example, the numeric value of the cyclic counter 102 is read and then saved in the event history 103. This step is repeated a predetermined number of times, to achieve a desired level of entropy. When enough cyclic counter values have been accumulated, i.e. when the predetermined number of events are detected, the event history values 103 are input to a deterministic random number generator (DRNG) 104. The output of the DRNG 104 is then saved and used as the encryption key 105 for the self-encrypting mass storage device 100.

Consider the following example: a micro-controller 108 is provided with a 16 bit cyclic counter 102 running at 1 MHz. At this rate, the cyclic counter 102 will wrap around from 0xffff to 0x0000 every 65.536 milliseconds. In relation to human response time, this is very fast, making it impossible for a human to interact with the input mechanism 101 to create duplicate random seeds in the event history 103.

Now assume the encryption engine 106 is using AES-256, which means it requires a 256 bit key with 256 bits of entropy. Since the cyclic counter 102, in this example, is 16 bits in length, it will require 16 events to generate a 256 bit random seed (16 bits×16 events=256 bits). For example, the recorded events—each 16 bits in length in this example—are strung together sequentially to form a much longer number, in this instance the much longer number being 256 bits in length. Therefore, the process of creating a PIN for authentication will require at least 16 button presses in order to generate the requisite amount of entropy.

It will be understood that the values stored in the event history for the 16 events need not be used sequentially in forming the 256 bit number, but can be used in any predetermined order, or even in a random order. All such variations would be within the ambit of skill of anyone having skill in the disk encryption arts.

Another source of entropy is the vibration sensor 112 discussed above. When connected to the micro-controller 108, the input signal will change state when vibration is detected. Thus, by simply handling the drive, random values are being created and stored in event history 103. This assures adequate entropy that is independent of PIN length.

Figure 2:
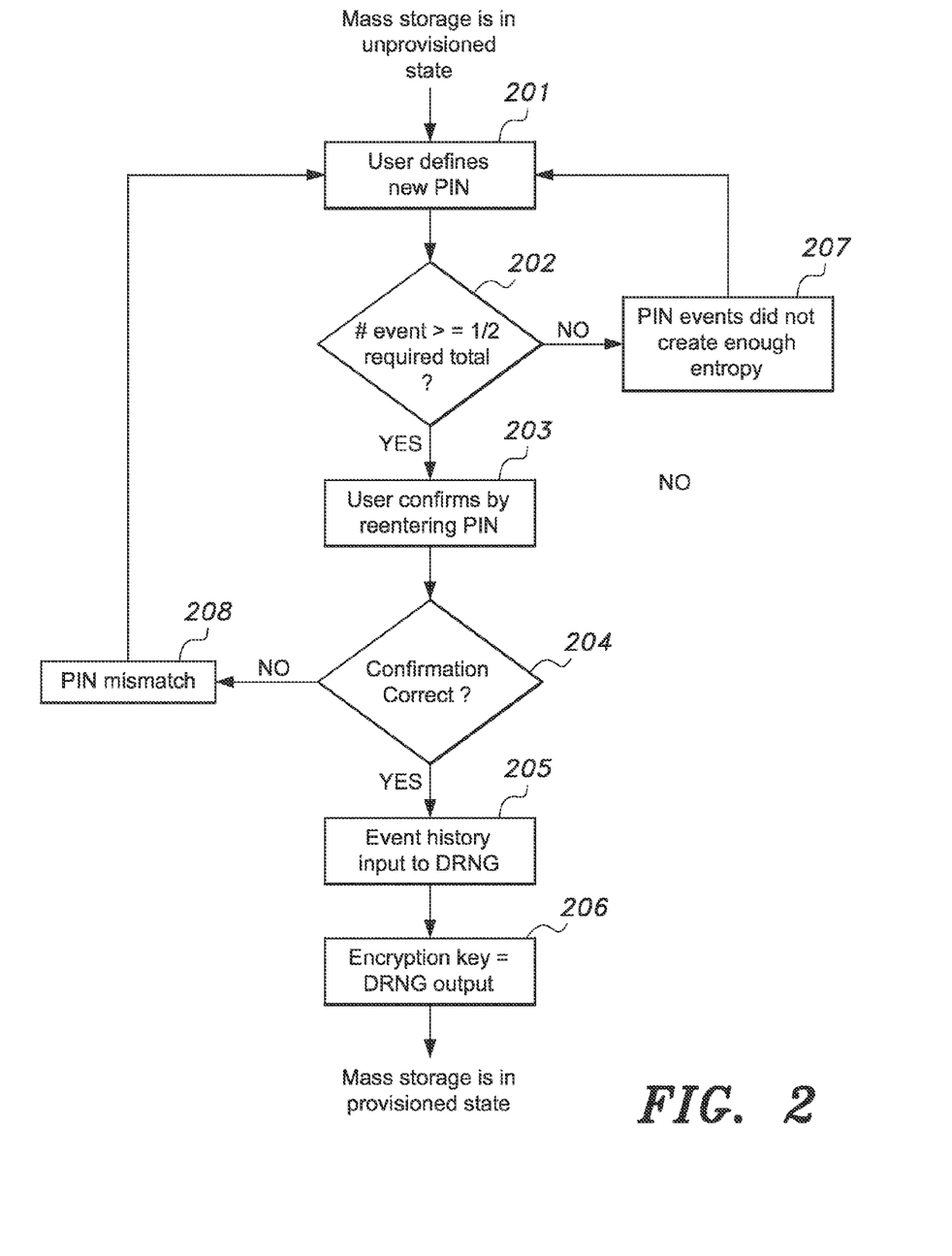
FIG. 2 represents a flow diagram showing a user defining a PIN which simultaneously results in the creation of a random seed with sufficient entropy.

FIG. 2 represents a flow diagram showing a user defining a PIN which simultaneously results in the creation of a random seed with sufficient entropy. The mass storage device 100 begins in the unprovisioned state, i.e. it has not been configured with any user PINs and is not useable. The process starts when a user defines a new PIN in step 201. In the embodiment of FIG. 1, this is accomplished by use of the input device 101. On each button press of the input device 101, an event is triggered that results in the current value of the cyclic counter 102 being recorded. After the user has entered their desired PIN, a check is performed at step 202 to determine the amount of entropy collected so far. For example, in order to create 256 bits of entropy, 16 events need be triggered on a 16 bit counter (16 bits×16 events=256 bits). Therefore, it will require at least 8 trigger events as a result of entering the new PIN as shown in 202.

The user confirms their PIN by entering it a $2^{nd}$ time as indicated in step 203. The assumption is that an 8 digit PIN entered twice yields 16 distinct trigger events. If PIN length did not create enough entropy, the process aborts and the user must try again as indicated in step 207.

If the $1^{st}$ and $2^{nd}$ PIN entries do not match (204) as tested in step 204, the process is aborted and the user must begin again, as indicated in step 208. If $1^{st}$ and $2^{nd}$ PIN entries match (204) in step 204, a new PIN is created and there is adequate entropy to create an encryption key. This YES value branches to step 205. At step 205, the event history is supplied as a seed value to the DRNG 205 and an encryption key is created as indicated in step 206. The mass storage device 100 is now in the provisioned state and ready for use.

In the foregoing discussion, the concept of "provisioning" a storage media is as defined for example in the online source "webopedia" as authenticating an initializing a drive for use. In the present invention, this includes (a) creating a PIN to identify a user, and (b) formatting the drive so data can be stored and retrieved. The formatting in (b) can be by creating and initializing a FAT (file allocation table), which is what happens for example during a "quick format" in a Windows (a ™ of Microsoft) operating system. A full format could optionally be used, but is not preferred, in view of the very much longer time needed to completely format a drive by writing data to every sector.

It should be pointed out that if the vibration sensor 112 is being used as a source of entropy, PIN length can be independent of entropy. Handling the mass storage device during manufacturing, shipping, sales, and unpacking will likely create more than enough trigger events. Even so, a separate test could be provided, analogous to FIG. 2, for ensuring sufficiency of the entropy generated by the vibration sensor 112. This could be significant, for example, if the vibration sensor 112 is inactivated, or if the wiring connecting it to the microcontroller 108 is not completely correct or is defective.

Figure 3:
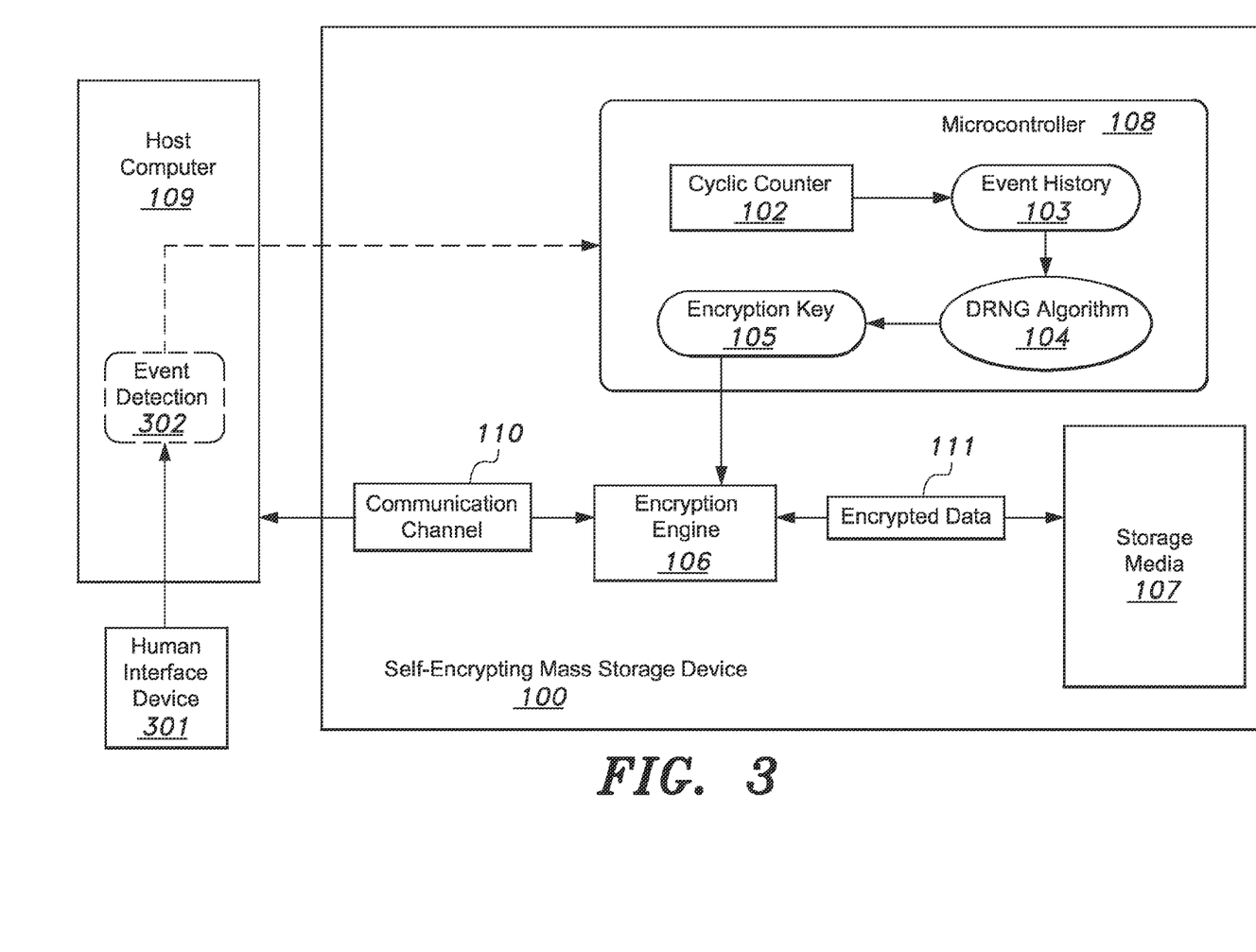
FIG. 3 schematically depicts a self-encrypting mass storage device and a separate HID which are both connected to a host computer, whereby event detection occurs in the host computer, to provide entropy creation.

FIG. 3 schematically depicts a self-encrypting mass storage device 100 and a separate HID 301 which are both connected to a host computer 109, whereby event detection 302 occurs in the host computer 109 to provide entropy creation. Here, the self-encrypting mass storage device 100 does not itself include an HID, and instead the HID 301 is electrically connected to the host computer 109. As the user is interacting with the computer 109, HID events are forwarded to the mass storage device 100 by event detection software, indicated at the event detection 302, resulting in a trigger (shown by the dashed line in FIG. 3) to read the cyclic counter 102.

These events can be sent via the same communication channel that contains clear data 110 or can be sent by a distinct channel. For example, a self-encrypting mass storage device 100 may connect as both a mass storage device 100 and a $2^{nd}$ independent device. In this case, the 2nd independent device is notified by the event detection routines 202, in real time, when the user types on the keyboard or clicks a mouse button.

Figure 4:
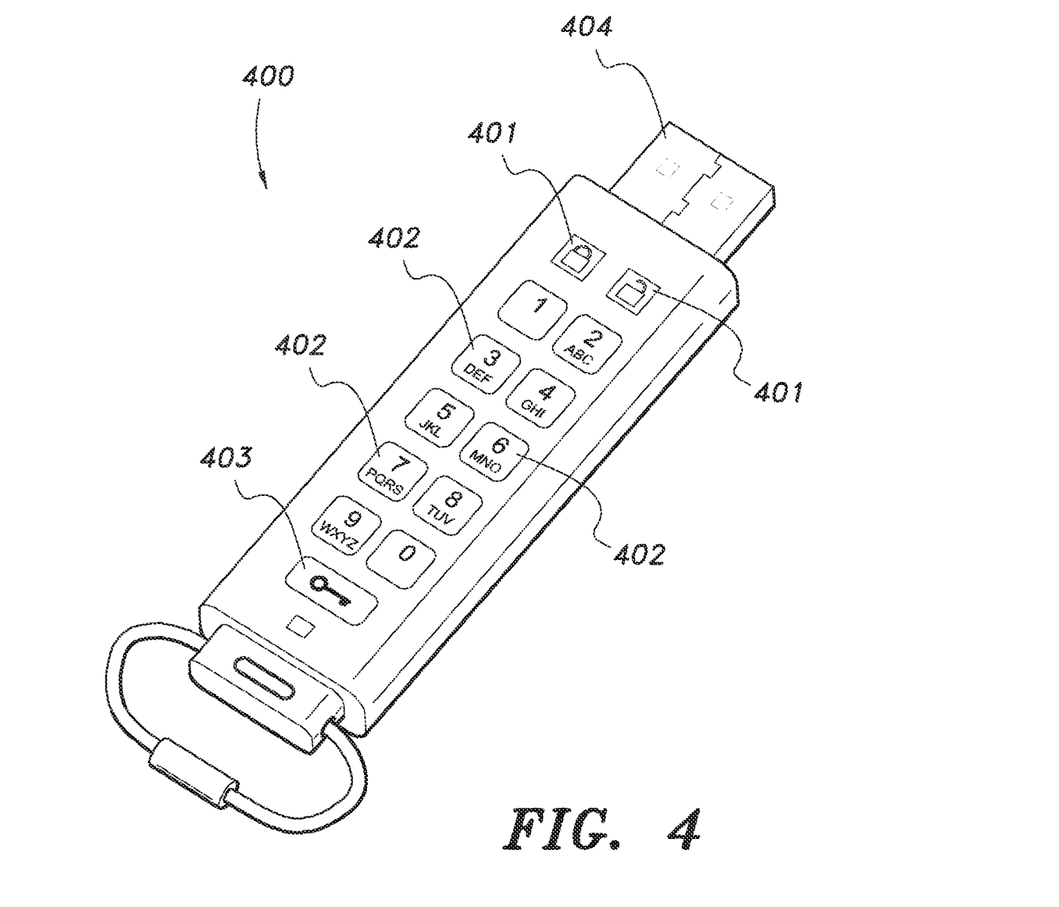
FIG. 4 is a perspective view of a preferred embodiment of a self-encrypting flash drive with integrated user authentication.

FIG. 4 is a perspective view of a preferred embodiment of a self-encrypting flash drive 400 with integrated user authentication. More specifically, the self-encrypting flash drive 400 is equipped with a USB connector 404 for making connections to a host computer 109. The self-encrypting flash drive 400 is locked by default and must be opened before access is provided to data contained within. This is done by entering a PIN via the input device 101 which here comprises a plurality of numeric buttons 402 and a key button 403. The process is as follows:
1) Push key button 103 to wake drive 400.
2) Drive 400 will wake from a sleep state and illuminate a red status indicator 401.
3) User enters a PIN by pushing the numeric buttons 402.
4) User pushes key button 403 to terminate PIN entry.
5) PIN is hashed and compared with an expected result.
6) Green status indicator 401 will illuminate if correct PIN was entered.

An unprovisioned self-encrypting drive 400 has neither a PIN nor an encryption key defined. Therefore, it must be provisioned before use. This is done by defining a PIN as shown in FIG. 2. In so doing, an encryption key is created concurrently with PIN creation, with entropy independent of PIN content. More specifically, the entropy is relatively much greater than that of the PIN content. Once the process of PIN definition is complete, the drive can be formatted and used to store data.

As an example, in operation, once the PIN has been set, the device 100 is ready for subsequent use. During subsequent use, the PIN is entered, and the microcontroller 108 uses the entered PIN to access the much longer and much more random encryption key 105. The encryption key 105 is then transferred to the encryption engine 106, which uses the encryption key 105 to decrypt the data residing on the storage media 107. That decrypted data is then forwarded to the host computer 109 in its decrypted form. Thus, the data then exists on the host computer 109 in clear form and it also resides in the storage media 107 in its encrypted form. The encryption engine 106 is what performs the conversion from clear text to cypher text in one direction, and from cypher text to clear text in the other direction.

The foregoing embodiments are described in sufficient detail to enable those skilled in the art to make and use the invention, and it is to be understood that other embodiments would be evident based on the present disclosure and that process or mechanical changes may be made without departing from the scope of the present invention.

As a further variation, the encryption key 105 can be stored either in a plain form or alternatively in any manner of an encrypted form. And, the encryption key—in plain form or encrypted form—can be stored within a memory inside the microcontroller 108 itself; in the storage media 107; or within a separate hidden memory which can be accessed only upon entry of a PIN. These and other variations would be within the ambit of anyone having skill in the disk encryption arts.

It will be further understood that during entry of the PIN, either initially or at any later times, software is provided within the microcontroller to perform the steps described hereinabove regarding detection of the key strokes, comparison the initial PIN with the reentered PIN, compilation of the events in the event history, and for any other operations described hereinabove. There and all other variations are within the ambit of skill of anyone having ordinary skill in the disk encryption arts.

In the foregoing description, numerous specific details are given to provide a thorough understanding of the invention. However, it will be apparent that the invention may be practiced without these specific details. In order to avoid obscuring the present invention, some well-known circuits, system configurations, and process steps are not shown in detail and would be understood by anyone having skill in the relevant art.

Further, the device 100 of the present invention can draw power from the host computer, as would be conventional for USB-type devices. The device 100 can alternatively have a separate power supply, for example using a power cord and adapter, for use with a conventional power outlet. Alternatively, the device can include its own battery as a power source, and this is a preferred embodiment where the above-discussed vibration sensor 112 is provided.

Likewise, the drawings showing embodiments of the apparatus/device are semi-diagrammatic and not to scale and, particularly, some of the dimensions are for clarity of presentation and are shown greatly exaggerated in the drawings.

While the invention has been described in conjunction with a specific best mode, it is to be understood that many alternatives, modifications, and variations will be apparent to those skilled in the art in light of the foregoing description and accompanying drawings. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a storage device comprising:
   receiving, from an input device, inputs for defining a personal identification number (PIN);
   obtaining a value of a cyclic counter after each input for defining the PIN;
   storing the obtained value to an event history in a memory after each input;
   receiving, from the input device, additional inputs for a confirmation PIN;
   retrieving the value of the cyclic counter after each additional input for the confirmation PIN;
   storing the retrieved value to the event history in the memory after each additional input;
   defining an encryption key based on a random number generator seeded with a value based on the event history;
   comparing the defined PIN to the confirmation PIN;
   determining that the defined PIN is validated when the confirmation PIN matches the defined PIN;
   enabling access to the storage device when the defined PIN is validated;
   encrypting data at the storage device using the encryption key; and
   storing the encrypted data in the storage device.

2. The method as claimed in claim 1, further comprising:
   decrypting the encrypted data, with an encryption/decryption engine, using the encryption key; and
   sending decrypted data through a communication channel to a host computer.

3. The method as claimed in claim 1, further comprising:
   sending encrypted data from the storage media to an encryption/decryption engine.

4. The method as claimed in claim 1, wherein a size of the cyclic counter is in a range of 2-16 bits, wherein a size of the random seed is equal to the size of the cyclic counter times a number of events in the event history.

5. A storage device comprising:
   an input device for receiving inputs for defining a personal identification number (PIN) and additional inputs for a confirmation PIN;
   a cyclic counter;
   a memory for storing an event history;
   a microcontroller for:
      obtaining a value of the cyclic counter after each input for defining the PIN;
      storing the obtained value of the cyclic counter to the event history after each input for defining the PIN;
      retrieving the value of the cyclic counter after each additional input for the confirmation PIN;
      storing the retrieved value of the cyclic counter to the event history;
      comparing the defined PIN to the confirmation PIN;
      determining that the defined PIN is validated when the confirmation PIN matches the defined PIN; and
      enabling access to the storage device when the defined PIN is validated;
   a random number generator for defining an encryption key, the random number generator being seeded based on the event history after a size of the event history is at least a size of a seed for the random number generator; and
   an encryption/decryption engine for encrypting data at the storage device using the encryption key and for storing the encrypted data in the storage device.

6. The storage device as claimed in claim 5, further comprising a vibration sensor.

7. The storage device as claimed in claim 5, wherein the encryption/decryption engine is for decrypting data with the encryption key.

8. The storage device as claimed in claim 5, wherein the microcontroller is for determining if the event history is equal to or exceeds a predetermined number.

9. The storage device as claimed in claim 5, wherein the microcontroller is for provisioning the storage device after defining the encryption key.

10. The storage device as claimed in claim 9, further comprising:
    a communication channel for sending decrypted data to a host computer.

11. The storage device as claimed in claim 9, wherein the storage device further comprises:
    storage media for storing the encrypted data.

12. The storage device as claimed in claim 9, wherein a size of the cyclic counter is in a range of 2-16 bits, wherein a size of the random seed is equal to the size of the cyclic counter times a number of events in the event history.

13. The method as claimed in claim 1, further comprising:
    provisioning the storage device after defining the encryption key.

14. A non-transitory machine-readable storage medium including instructions that, when executed by a machine, cause the machine to perform operations comprising:
    receiving, from an input device, inputs for defining a personal identification number (PIN);
    obtaining a value of a cyclic counter after each input for defining the PIN;

storing the obtained value to an event history in a memory after each input;

receiving, from the input device, additional inputs for a confirmation PIN;

retrieving the value of the cyclic counter after each additional input for the confirmation PIN;

storing the retrieved value to the event history in the memory after each additional input;

defining an encryption key based on a random number generator seeded with a value based on the event history;

comparing the defined PIN to the confirmation PIN;

determining that the defined PIN is validated when the defined PIN matches the confirmation PIN;

enabling access to the storage device when the defined PIN is validated;

encrypting data at the storage device using the encryption key; and storing the encrypted data in the storage device.

15. The machine-readable storage medium as recited in claim 14, wherein the machine further performs operations comprising:

decrypting the encrypted data, with an encryption/decryption engine, using the encryption key; and sending the decrypted data through a communication channel to a host computer.

16. The machine-readable storage medium as recited in claim 14, wherein the machine further performs operations comprising:

sending encrypted data from storage media to an encryption/decryption engine.

17. The machine-readable storage medium as recited in claim 14, wherein a size of the cyclic counter is in a range of 2-16 bits, wherein a size of the random seed is equal to the size of the cyclic counter times a number of events in the event history.

18. The machine-readable storage medium as recited in claim 14, wherein the machine further performs operations comprising:

provisioning the storage device after defining the encryption key.

* * * * *